US010721388B2

(12) United States Patent
Jiang et al.

(10) Patent No.: US 10,721,388 B2
(45) Date of Patent: Jul. 21, 2020

(54) VIDEO MOTION EFFECT GENERATION BASED ON CONTENT ANALYSIS

(71) Applicant: HULU, LLC, Santa Monica, CA (US)

(72) Inventors: Yunsheng Jiang, Beijing (CN); Xiaohui Xie, Beijing (CN); Ran Cao, Beijing (CN)

(73) Assignee: Hulu, LLC, Santa Monica, CA (US)

( * ) Notice: Subject to any disclaimer, the term of this patent is extended or adjusted under 35 U.S.C. 154(b) by 166 days.

(21) Appl. No.: 15/934,583

(22) Filed: Mar. 23, 2018

(65) Prior Publication Data
US 2019/0297248 A1    Sep. 26, 2019

(51) Int. Cl.
| | | |
|---|---|---|
| H04N 5/232 | (2006.01) |
| H04N 5/262 | (2006.01) |
| G06T 5/00 | (2006.01) |
| G06T 7/00 | (2017.01) |
| G06K 9/00 | (2006.01) |
| H04N 21/00 | (2011.01) |

(52) U.S. Cl.
CPC ..... H04N 5/23212 (2013.01); H04N 5/23219 (2013.01); H04N 5/23296 (2013.01); H04N 5/2621 (2013.01)

(58) Field of Classification Search
CPC ............ H04N 5/23212; H04N 5/2621; H04N 5/23296; H04N 5/23219
See application file for complete search history.

(56) References Cited

U.S. PATENT DOCUMENTS

| | | | | |
|---|---|---|---|---|
| 2004/0264939 A1* | 12/2004 | Hua | .................... | H04N 1/32101 386/280 |
| 2015/0350560 A1* | 12/2015 | Zhou | ...................... | H04N 5/262 348/576 |
| 2017/0285916 A1* | 10/2017 | Xu | .......................... | G06T 11/60 |

* cited by examiner

Primary Examiner — Ahmed A Berhan
(74) Attorney, Agent, or Firm — Fountainhead Law Group, PC

(57) ABSTRACT

In one embodiment, a system detects objects in an image and generates attention regions that are positioned in the image based on first positions of the objects in the image. Focus points for the objects are generated for the attention regions at one or more second positions. Focus boxes are generated using the second positions of the focus points. Then, the system generates information for a motion effect using content of the image based on a number of the focus boxes and third positions of the focus boxes.

20 Claims, 12 Drawing Sheets

VIDEO MOTION EFFECT GENERATION BASED ON CONTENT ANALYSIS

BACKGROUND

A motion effect may be applied to still images to make the images look more vivid and attractive. For example, one type of motion effect, referred to as a "Ken Burns" effect, is one in which a still image is displayed with a slow zooming and/or panning effect as well as fading transitions between frames. For example, the Ken Burns effect may zoom in on a character of interest in the image or zoom out from the character of interest. Also, a panning effect may pan from one side of the image to another side of the image to change focus from one object to another object. The zooming and panning effects may catch a user's eye when viewing the image as opposed to just displaying a still image.

To create a Ken Burns effect, a user may review a still image and manually create one or more boxes in the image. For a zooming motion effect, the user may create a first box around an object in the image and another larger box around the first box. The Ken Burns effect could then zoom in from displaying content in the larger box to displaying content in the smaller box or zoom out for the smaller box to the larger box. Also, the user may choose to create a panning effect by creating separate multiple boxes in the image. The Ken Burns effect then creates the panning effect by displaying content from one box to displaying content in the other box. The above manual process is inefficient and requires the user to review and analyze each image. When a video delivery service has a large amount of images for which to create the motion effects, the above process may be time-consuming. Also, the above process may rely on a user's subjective judgment to create the effects. That is, the user decides which object to zoom in on or zoom out from, or which objects to pan from and to. The user's subjective judgement may not always create the most desired effect. One way to not manually define the Ken Burns effect is to randomly select the zooming and/or panning operations. The random generation of the Ken Burns effect, however, may not always result in the most desired or attractive use of the effect.

DETAILED DESCRIPTION

Figure 1:
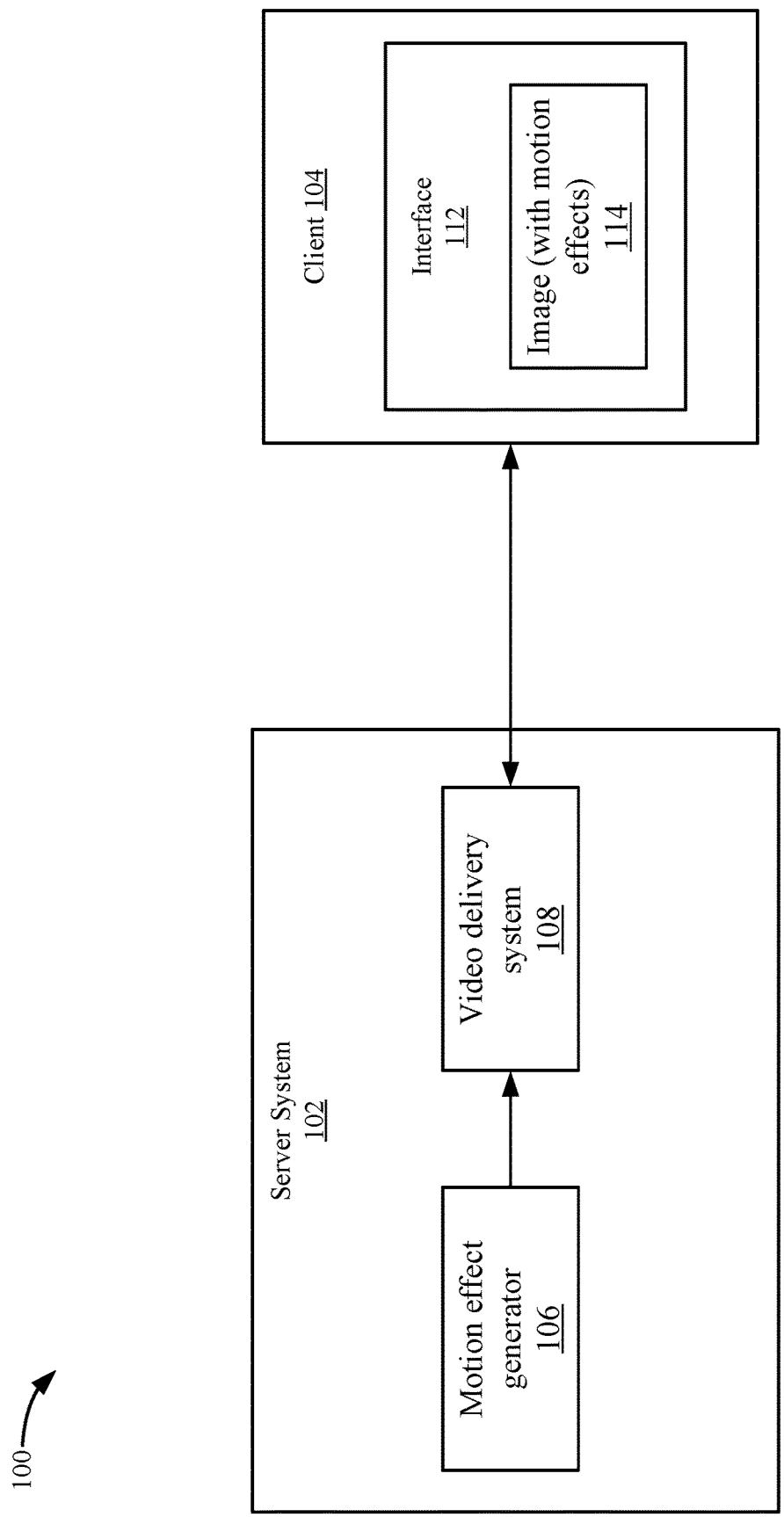
FIG. 1 depicts a simplified system for generating motion effects according to some embodiments.

Described herein are techniques for a motion effect generation system. In the following description, for purposes of explanation, numerous examples and specific details are set forth in order to provide a thorough understanding of some embodiments. Some embodiments as defined by the claims may include some or all of the features in these examples alone or in combination with other features described below, and may further include modifications and equivalents of the features and concepts described herein.

Some embodiments apply a motion effect to still images automatically by analyzing the characteristics of the image. The system uses the analysis to generate one or more attention areas in the image. Then, from the attention areas, the system generates focus points, which are then used to generate focus boxes. The use of focus points is different from the process in the Background, which starts from manually setting boxes first. The use of focus points provides a better motion effect because the system generates a motion effect that focuses on points of interest that are defined by the focus points. For example, the zooming in motion effect may zoom in on a focus box that is generated based on a focus point that the system selected. If the system determines that the focus point may be the most distinctive point in the image, then the motion effect may have the most desirable or eye-catching effect for a user.

In some embodiments, the system receives a still image and analyzes the characteristics of the image using an object detection process. The object detection process can detect one or more objects in the image, such as features of a human (e.g., a human face) or salient objects/regions (e.g., a salient object/region includes a state or a quality that makes the object/region stand out relative to its neighbors). Once detecting the objects in the image, the system generates one or more attention regions based on the position of the object. For example, the system may place an attention region around a detected object.

In some embodiments, the system selects the type of motion effect based on the number of attention regions in the image. For example, when the image includes a single attention region, the system uses a zooming in or out motion effect. When the image includes multiple attention regions, the system may use a panning effect. Focus points are then placed in the image according to the attention regions. A focus point for a human face may be placed at a position in the face, such as between the eyes. For a salient object, a focus point may be placed at a central point of the attention region. For each focus point, the system generates a corresponding focus box, such that the central point of the focus box is as close to the focus point as possible, of course under the constraint of image boundary. For example, when the image includes a single attention region, the system may set a first focus point positioned at the only attention region, as well as a second focus point at another position, such as a focus point positioned at the central point of the image, and then generate two focus boxes: one focus box corresponds to the first focus point with generally the size of attention region, and the other focus box corresponds to the second focus point with generally the size of the image. For multiple attention regions, the system may set multiple focus points, with each focus point corresponding to one attention region, and then multiple focus boxes are generated based on the multiple focus points in the image, where the focus boxes may be slightly smaller than the size of the image. This creates multiple focus boxes that are in different positions in the image.

The focus boxes can then be used to generate the motion effect. For example, the system generates a zooming in effect by zooming in from one larger focus box to the other smaller focus box or a zooming out effect by zooming out from the smaller focus box to the larger focus box. Also, the system generates a panning effect by panning from one focus box to another focus box.

System Overview

FIG. 1 depicts a simplified system 100 for generating motion effects according to some embodiments. A server system 102 includes a video delivery system 108 that interacts with a client 104 to generate an interface 112. Although only a single instance of server system 102 and client 104 is described, it will be understood that server system 102 may include multiple devices that include distributed functions as described below, and also multiple clients 104 may be interacting with server system 102. Video delivery system 108 may be associated with a video delivery service that provides videos to client 104, which accesses the videos through interface 112. While browsing interface 112, interface 112 may display images from the videos. Interface 112 then applies motion effects to the images. Instead of playing a video clip of a few seconds, a motion effect for a single image may be generated on interface 112. The motion effect may be a more lightweight operation in comparison to playing a video clip. This may allow video delivery system 108 to show some motion effects in interface 112 to catch a user's eye but the effect may be displayed faster than downloading an entire video clip. For example, a still image may be delivered to client 104 with parameters to perform the motion effect, which uses less bandwidth than sending a video clip to client 104. The sending of less data may use less bandwidth and also allows the image to be displayed faster. Additionally, the motion effect may still be attractive to a user due to the simulation of motion. Also, if the video delivery service still wants to display a video clip, displaying the image with the motion effect first allows time for the video clip to be downloaded.

Interface 112 may generate the motion effect based on information defining how to apply the motion effect, which is received from server system 102. Before displaying interface 112, a motion effect generator 106 generates the information that will be used by interface 112 to generate the motion effects. Motion effect generator 106 receives images, such as images from videos being offered by the video delivery service. In some embodiments, motion effect generator 106 may select which images should be used to generate motion effects. In other embodiments, motion effect generator 106 receives only images that will be displayed on interface 112.

Motion effect generator 106 analyzes characteristics for the images and generates information for applying motion effects for the images. For example, the motion effect may be a Ken Burns effect that generates a zooming motion effect and/or a panning motion effect. Although a Ken Burns effect is described, it will be understood that motion effect generator 106 may generate other types of motion effects.

Motion effect generator 106 may automatically generate the information for the motion effect based on an analysis of image 114. In the process, motion effect generator 106 may analyze image 114 for objects. When objects are detected, motion effect generator 106 generates attention regions that define the objects. From the attention regions, motion effect generator 106 generates focus points for the objects. The focus points are then used to generate focus boxes, which motion effect generator 106 uses to generate the information for the motion effect.

Motion effect generator 106 can automatically generate the motion effects based on the focus points. The use of the focus points may provide a standardized method of generating the motion effects. When a large number of images are being analyzed, the standardized process may generate motion effects that are more objective than motion effects generated by a user because standard criteria are being applied to generate the motion effects. This is different from a user manually setting the motion effects. Previously, as discussed in the Background, because the motion effects were generated manually, focus points did not need to be used. Rather, in the Background, the subjective view of a user is used to select the boxes. However, the use of the focus points allows the automatic generation of the motion effects and also ensures the motion effect focuses on focus points that are part of the objects that are detected.

Once generating the information for the motion effect, motion effect generator 106 may send the information for the motion effect to video delivery system 108. As discussed above, video delivery system 108 manages the delivery of videos to clients 104. In addition to delivering videos, video delivery system 108 may also generate interface 112 on client 104 that a user can use to browse videos being offered by the video delivery service. When browsing to different aspects of interface 112 (e.g., sections, windows, items, etc.), video delivery system 108 may cause motion effects to be applied to images displayed in interface 112. For example, interface 112 may display an image 114 and use information for the motion effects to generate the motion effects for the image in interface 112.

Interface 112 may have interface content other than the image that is displayed in interface 112, such as menu items, text, etc. The interface content may be displayed in a structure, such as text may be displayed on a left side of interface 112. As will be discussed in more detail below, the structure of interface 112, such as a position of text or menus on interface 112, may be taken into account when generating the motion effects for images 114. For example, interface 112 may include text on the left-hand side of interface 112 and the motion effects for images may be generated such that the focus of the motion effect does not interfere with the text or avoids the text. For example, it may be undesirable if a character that is displayed behind the text of interface 112 is the focus of a zooming in motion effect.

It may be harder for a user to manually set a motion effect on an image without knowing the structure of the interface. The automatic process may use the structure of the interface content to select focus points that avoid interfering with interface content of interface 112.

Motion Effects Examples

Figure 2A:
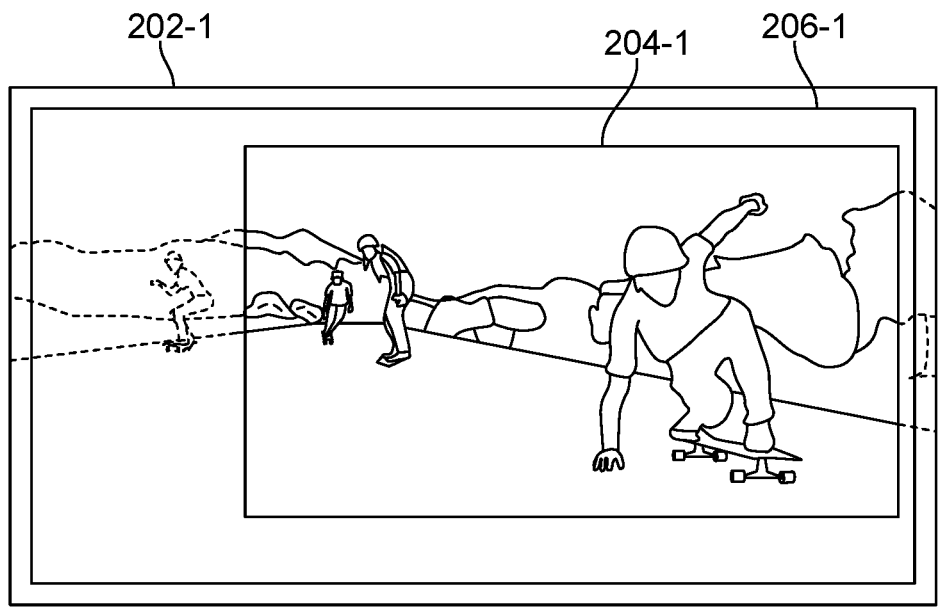
FIGS. 2A and 2B depict an example of a zooming in motion effect according to some embodiments.
Figure 2B:
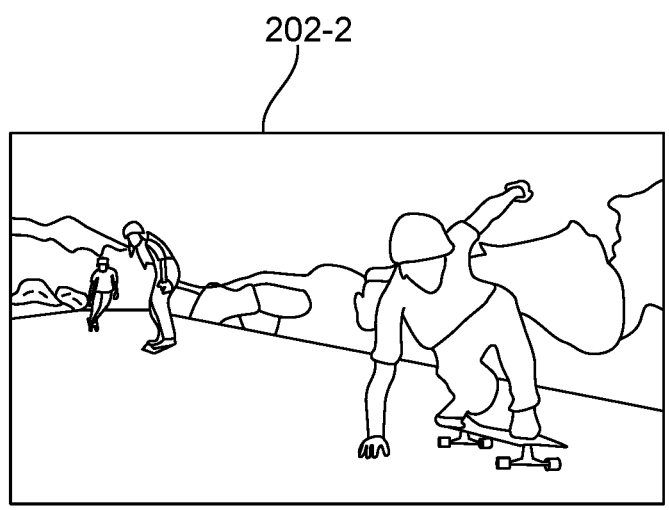

FIGS. 2A and 2B depict an example of a zooming in motion effect according to some embodiments. In FIG. 2A, a first instance of an image 202-1 is shown before a zooming in motion effect is applied and a second image 202-2 is shown after the zooming in motion effect is applied. A focus box 204-1 is included in image 202-1. The focus box 204-1 may be smaller than the entire image and focuses on one or more objects in image 202-1. Another focus box 206-1 may then be inserted as the size of the entire image 202-1 although focus box 206-1 may be other sizes that are between the size of focus box 204-1 and the size of image 202-1. For example, focus box 206-1 may be slightly smaller than the size of the image.

In FIG. 2B, to perform the zooming in effect, interface 112 displays the content found within focus box 206-1 and then zooms in to display the content from inside focus box 204-1. For example, the entire content as shown in image 202-1 is first displayed and then a gradual zooming in effect is applied to the image until only the content found within focus box 204-1 is shown. The content from the image 202-1 outside of focus box 204-1 is not displayed when the zooming in effect has zoomed in to display only the content within focus box 204-1. As is known, the zooming in effect slowly decreases the content shown in interface 112 by decreasing the size of focus box 206-1 until focus box 206-1 equals the size of focus box 204-1.

Interface 112 may also apply a zooming out motion effect using focus box 204-1 and focus box 206-1. However, the process zooms out from displaying content in focus box 204-1 to displaying content in focus box 206-1. In this example, interface 112 first displays the content within focus box 204-1. Interface 112 then applies a gradual zooming out by expanding focus box 204-1 until it expands to eventually display the content within focus box 206-1.

Figure 3:
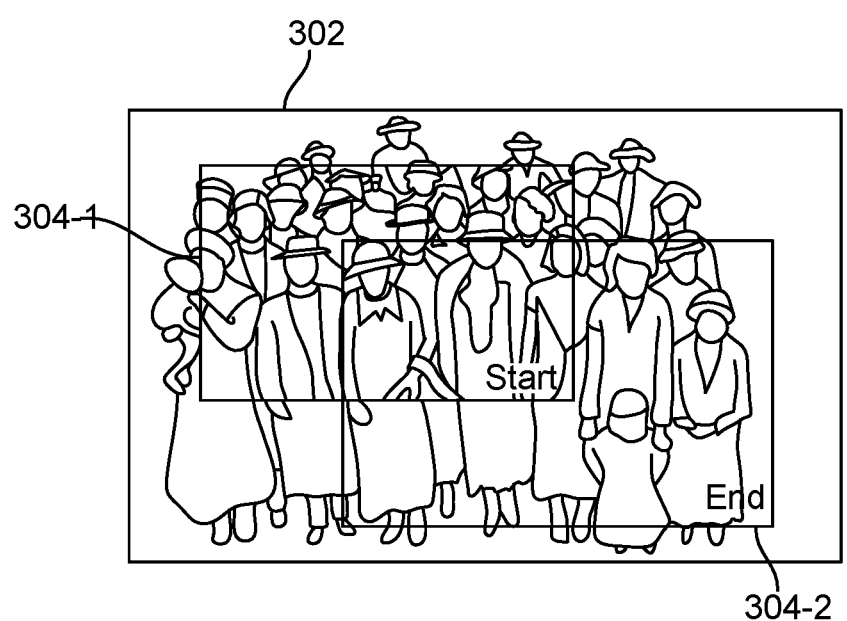
FIG. 3 depicts an example of a panning motion effect according to some embodiments.

FIG. 3 depicts an example of a panning motion effect according to some embodiments. A single image 302 is shown with multiple focus boxes 304-1 and 304-2. A starting focus box 304-1 marks the start of the panning effect and a second focus box 304-2 marks the end of the panning effect. Focus box 304-1 includes a first set of content that is shown first and focus box 304-2 includes a second set of content that is shown second. The second content in second focus box 304-2 is different from the content in first focus box 304-1. The panning effect moves the content from first focus box 304-1 to second focus box 304-2 in a panning motion. That is, first focus box 304-1 may be moved in a panning motion until it reaches second focus box 304-2 with the content within the focus box being displayed in interface 112 during the panning motion.

Overall Process Flow

Figure 4:
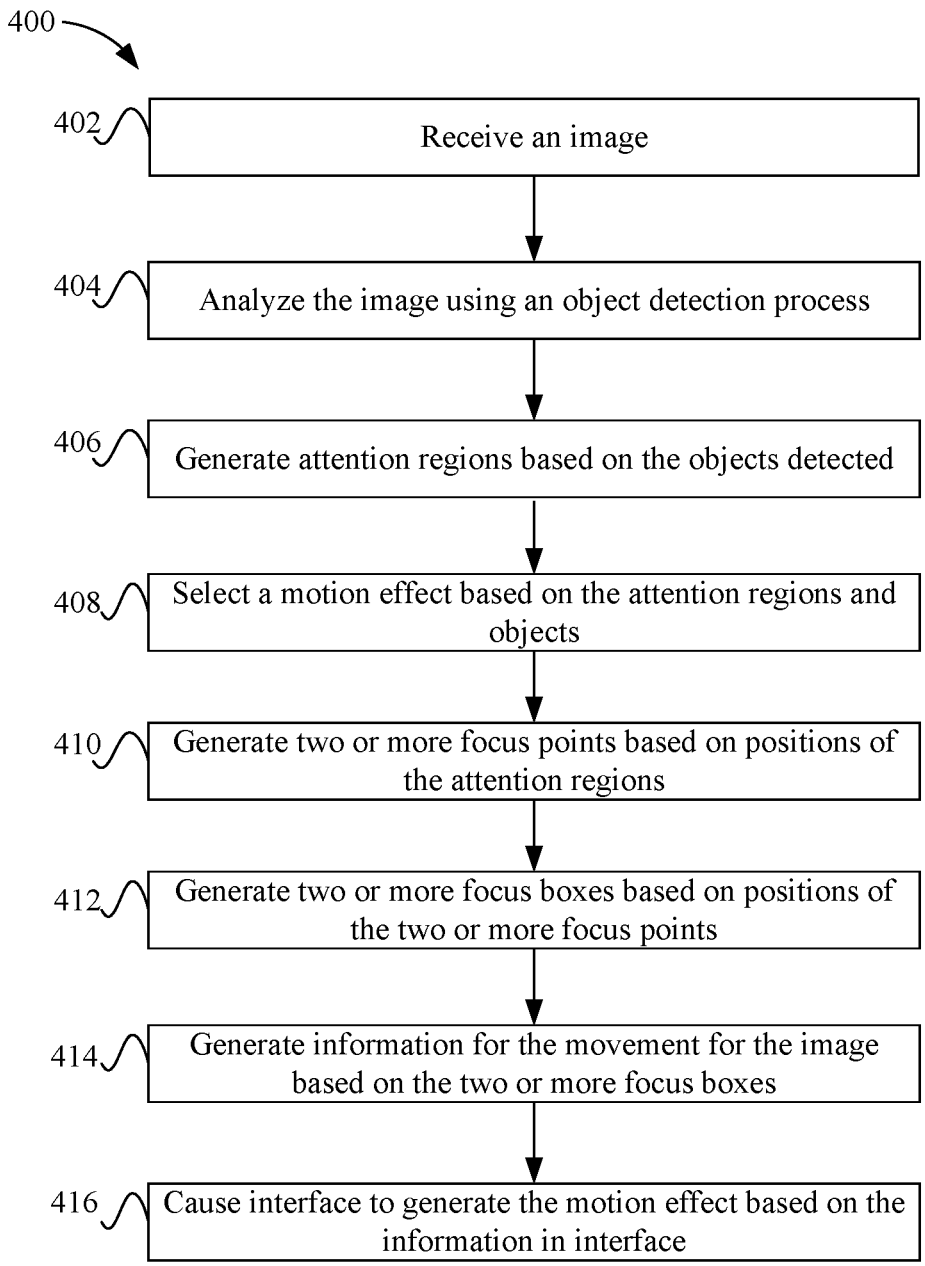
FIG. 4 depicts a simplified flowchart of a method for generating motion effects according to some embodiments.

FIG. 4 depicts a simplified flowchart 400 of a method for generating motion effects according to some embodiments. At 402, motion effect generator 106 receives an image. As discussed above, the image may be a still image from a video being offered by the video delivery service.

At 404, motion effect generator 106 analyzes the image using an object detection process. The object detection process may analyze the characteristics of the image using one or more detection processes, such as processes to detect faces or salient objects. For example, a human detection process may be performed, such as a face detection process that is configured to detect features of a human face. Then, if faces are not detected, motion effect generator 106 runs a salience detection process to detect salient objects/regions. In some embodiments, motion effect generator 106 runs a face detection process first and if faces are detected, motion effect generator 106 does not run the salience detection process. In other embodiments, motion effect generator 106 runs both the face detection and the salience detection processes and the detected faces and salient objects are considered together.

At 406, depending on the objects detected, motion effect generator 106 generates attention regions based on the objects detected. The attention regions may define the objects, such as the regions may be generated around the objects that are detected. For example, facial features may be detected for a face (e.g., a nose, eyes, mouth). To represent the features, motion effect generator 106 generates a box as an attention region to encompass the facial features, such as encompassing an entire face. For a salient object, motion effect generator 106 generates the attention region to encompass the salient object. It is noted that the attention regions may include content other than the faces or salient objects detected. Usually, rectangular boxes may be placed around the objects as attention regions. However, other shapes may be used to generate the attention regions, such as the attention region may follow the outline of the face or salient object, or be a circle, polygon, or other shape. The attention regions denote areas of interest in the image on which a motion effect could be based. Attention regions may be determined using the results of the previous object detection step with standard representation and some post-processing. Here the "standard representation" means that, the detected objects/regions are represented with rectangles, polygons, etc., which standardizes the shapes used for attention regions and makes it more convenient for subsequent steps (e.g., to determine the position of focus points). In post-processing, the object detection process may detect a number of objects, but motion effect generator 106 may not use all of them as attention regions. For example, motion effect generator 106 may eliminate some minor objects, such as objects that are below a certain size. Also, if detected objects are close to each other, a single attention region could be produced to cover these multiple objects.

At 408, motion effect generator 106 selects a type of motion effect to apply. For example, motion effect generator 106 may select the type of motion effect based on the number of attention regions. In some embodiments, the zoom in or out motion effect is selected when only one attention region is detected. The panning motion effect is selected when two or more attention regions are detected. Motion effect generator 106 may also select the motion effect based on other factors. For example, the image may include multiple attention regions, but only one attention region is deemed the most important (e.g., it is associated with main characters and not extras in a show or movie). Motion effect generator 106 may use only the most important attention region and select a zoom in motion effect. Also, sometimes motion effect generator 106 needs to consider the global location configuration of the attention regions. For example, if all the attention regions are located in the same part of the image (e.g., the left half side or right half side), motion effect generator 106 may use a zooming in or out effect instead of a panning effect, or enlarge the visual scope of panning effect (i.e., larger focus boxes) to let users see more content in the image.

At 410, motion effect generator 106 generates two or more focus points based on the positions of the attention regions in the image, as well as the type of motion effect that will be applied. The positions of the focus points may be based on the type of object detected. For example, for a face, motion effect generator 106 may generate the focus point as a position between the two eyes detected in the face. For a salient region, motion effect generator 106 may generate the focus point as the position in the center of the object in the attention region.

Then, motion effect generator 106 uses focus points to generate focus boxes. For each focus point, motion effect generator 106 generates a corresponding focus box, such that the central point of the focus box is as close to the focus point as possible under the constraint of image boundary. For example, at 412, motion effect generator 106 generates two or more focus boxes based on the positions of the two or more focus points. Usually the focus point and the focus box represent the attention region. The focus point denotes a position in the attention region and the focus box is the actual visual scope or window that is used to generate the motion effect. In some embodiments, the focus boxes may be generated to have the same aspect ratio to avoid any blurring when the motion effect is applied.

Motion effect generator 106 may generate the focus points and focus boxes based on different factors, such as the number of attention regions in the image, and/or the type of motion effect that will be used. In some embodiments, when only one attention region is found in the image, motion effect generator 106 selects the zooming in or out motion effect to apply to the image. Motion effect generator 106 generates two focus points: the first focus point is placed based on the position of the single attention region, and the second focus point is placed at another point, such as the central point of the image. Then two focus boxes are generated: one focus box corresponds to the first focus point whose size is generally the size of the attention region, and the other focus box corresponds to the second focus point whose size is generally the size of the image. The zooming in or out motion effect may be used to directly focus from the whole image to that one attention region or vice versa. In other examples, when there are multiple attention regions, motion effect generator 106 may select the panning motion effect, but in other embodiments, motion effect generator 106 may select the zooming in or out motion effect if the focus points are very close together. For the panning motion effect, motion effect generator 106 generates multiple focus points, with each corresponding to one attention region, and then multiple focus boxes are generated based on the multiple focus points. The sizes of focus boxes may be smaller than the size of the image. This is because the panning effect is performed using the multiple focus boxes and the focus boxes need to be smaller than the image to pan from one focus box to the other focus box.

At 414, motion effect generator 106 generates information for the motion effect based on the two or more focus boxes. The information may identify the type of movement to perform and the positions of the focus boxes. For example, coordinates for the focus boxes and directions to zoom in or zoom out from which focus box may be performed for a zoom in/out motion effect. For a panning effect, coordinates for the starting focus box and the ending focus box may be generated with directions on which focus box is the starting focus box and which focus box is the ending focus box.

At 416, video delivery service 108 may cause interface 112 to generate the motion effect using the image based on the information in interface 112. In other examples, video delivery service 108 may generate the motion effect on other interfaces, such as on a local machine for an administrator to review.

Attention Region, Focus Point, and Focus Box Examples

Figure 5A:
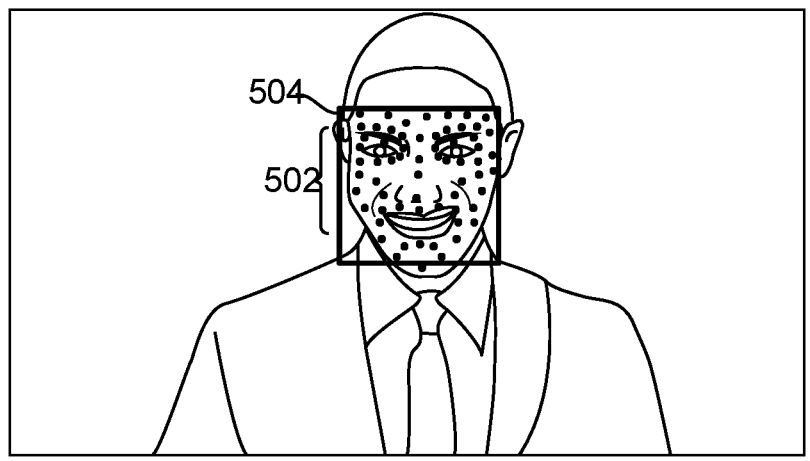
FIG. 5A shows an example of detecting only one face and generating one attention region according to some embodiments.
Figure 5B:
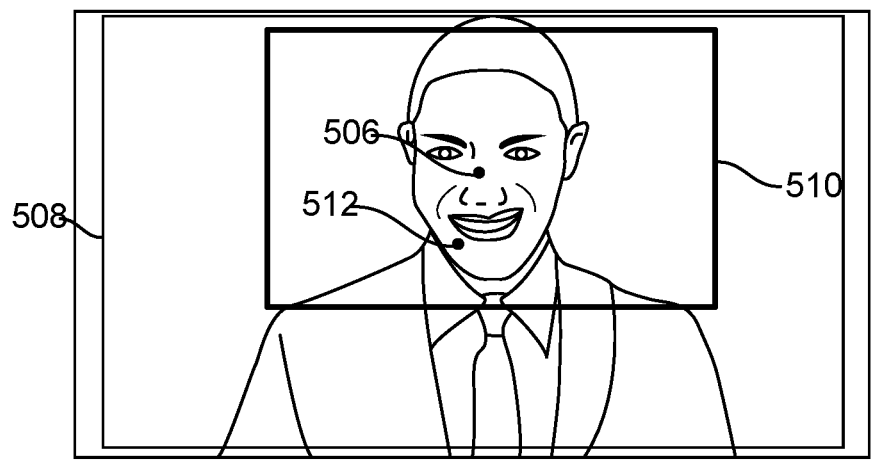
FIG. 5B shows an example of focus points and focus boxes generated from the detected face according to some embodiments.

FIGS. 5A and 5B show examples of generating attention regions, focus points, and focus boxes according to some embodiments. FIG. 5A shows an example of an object detection process according to some embodiments. The object detection process may detect points on a face as shown at 502. The points are shown as dots that may correspond to facial features, such as the eyebrows, eyes, nose, mouth, and face outline of a human face. An attention region may be formed at 504 in the form of a shape, such as a rectangle; however, other shapes may also be formed, such as circles, or freely formed shapes based on the detected facial features. The attention region may encompass the points shown at 502 and defines the object.

FIG. 5B shows an example of focus points and focus boxes for the zooming in effect according to some embodiments. A focus point is shown at 506 that has been positioned in an area between the eyes of the detected face. Although this position is used, other positions may be used for the focus point, such as the tip of the nose, the mouth, the chin, etc. Besides, another focus point 512 is also generated at the central point of the image. Motion effect generator 106 may then generate a focus box at 510 using the focus point at 506, and another focus box at 508 using the focus point at 512. The focus points may be used instead of the attention regions because the focus points are the actual positions to focus on, while the focus boxes are the actual viewing windows in which the content is visible to users in the interface 112. The focus boxes are computed based on the focus points, as well as the size (and aspect ratio) of the visible windows. That is, for a particular focus point, its corresponding focus box may be different for different interfaces if the sizes (or aspect ratio) of visible windows are changed in the interfaces. Accordingly, using the focus points and focus boxes provide a better motion effect compared to just using attention regions.

The central point of the focus box may be as close to its corresponding focus point as possible, given the limitations of image size and the pre-set focus box size. In some embodiments, for a given focus point [fx, fy], where fx is the focus point position in the x direction and fy is the focus point position in the y direction, and a pre-set focus box size of [fw, fh], where fw is the width of the focus box and fh is the height of the focus box. When using a rectangular box, the top-left point of the corresponding focus box may be computed as follows:

$$[\min(\max(0, fx-0.5*fw), iw-fw), \min(\max(0, fy-0.5*fh), ih-fh)],$$

where iw, ih are the width/height of image, and the coordinate values use the top left point of the image as the origin point. In some examples, when only a single attention region is included in the image, motion effect generator 106 may set two focus boxes: one focus box is generated from the focus point positioned by the single attention region, whose size the generally the size of the attention region; the other focus box is generated from a default focus point positioned at the center of the image, whose size is generally the size of the image or a slightly smaller size.

The focus box is shown at 508 as being slightly smaller than the image size with the central point of the image as the corresponding focus point at 512. Another focus box 510 may be set based on the focus point 506 generated from the attention region 504 and has similar size of attention region 504 or slightly bigger to comply with aspect ratio requirements. The sizes of the focus boxes are different, which causes the zooming in effect when moving from displaying contents in one focus box 508 including the entire image to displaying the contents in the other focus box 510 including the attention region. For the zooming out motion effect, the starting focus box may be set as a focus box 510 around the attention region and the ending focus box 508 may be set as the image size or slightly smaller than the image size. The zooming out effect moves from displaying content from the focus box around the attention region to displaying content from the entire image. In both of the above motion effects, the two focus boxes have different sizes, and cause the zooming in or out effect when moving between the different focus boxes.

Figure 6A:
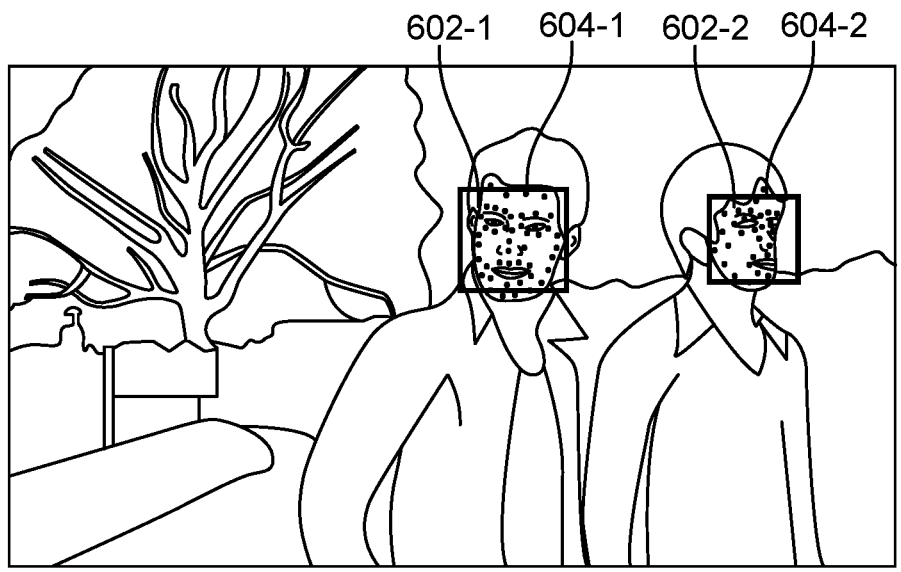
FIG. 6A shows an example of detecting two faces and generating two attention regions according to some embodiments.
Figure 6B:
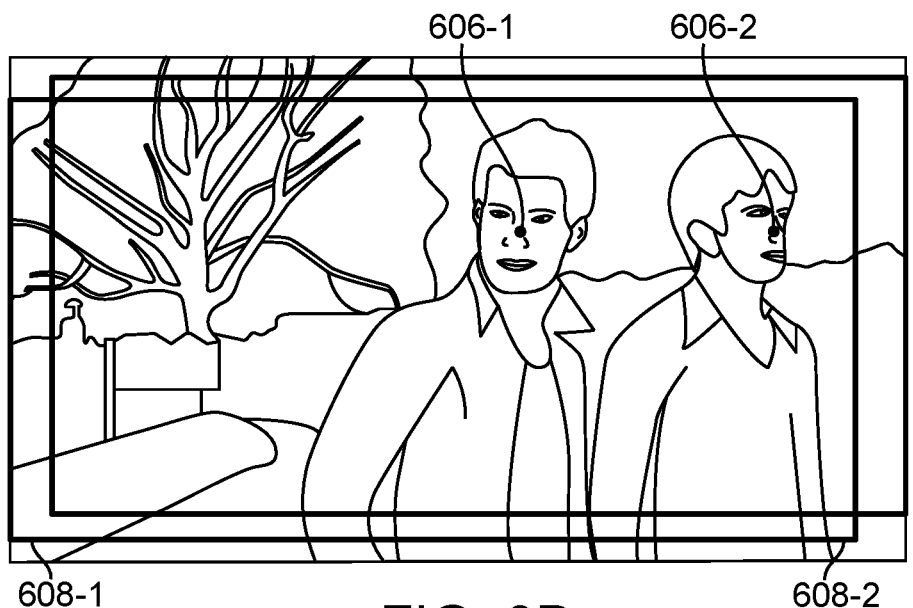
FIG. 6B shows an example of focus points and focus boxes generated from the two detected faces according to some embodiments.

Motion effect generator 106 may also detect two or more objects, which may change the type of motion effect that is applied. FIGS. 6A and 6B show examples when two objects in an image are detected according to some embodiments. FIG. 6A shows an example of detecting multiple objects and generating multiple attention regions according to some embodiments. A first object at 602-1 is detected as a face and includes points for the facial features of the face. A second face is detected at 602-2 at a different position from the first face with different points associated with the facial features. Motion effect generator 106 generates a first attention region 604-1 around the first face and a second attention region 604-2 around the second face. The first attention region 604-1 is in a different position from the second attention region 604-2 in the image.

FIG. 6B shows an example of generating focus boxes for focus points according to some embodiments. Motion effect generator 106 generates a first focus point 606-1 for the first attention region of the first face and a second focus point 606-2 for the second attention region of the second face. From the focus points, motion effect generator 106 generates focus boxes 608-1 and 608-2. Motion effect generator 106 places first focus box 608-1 using focus point 606-1 in the image. Then, motion effect generator 106 places a second focus box 608-2 using focus point 606-2 in the image. It is noted that, the positions of focus boxes may not be exactly the same as the computation results of the equation described above. For a panning motion effect, if the multiple focus boxes computed according to the equation are too close or even the same, motion effect generator 106 may offset the multiple focus boxes more to let the users see more content in the whole panning motion process. The panning motion effect may pan to display content from focus box 608-1 to displaying content from focus box 608-2 in some embodiments.

Figure 7A:
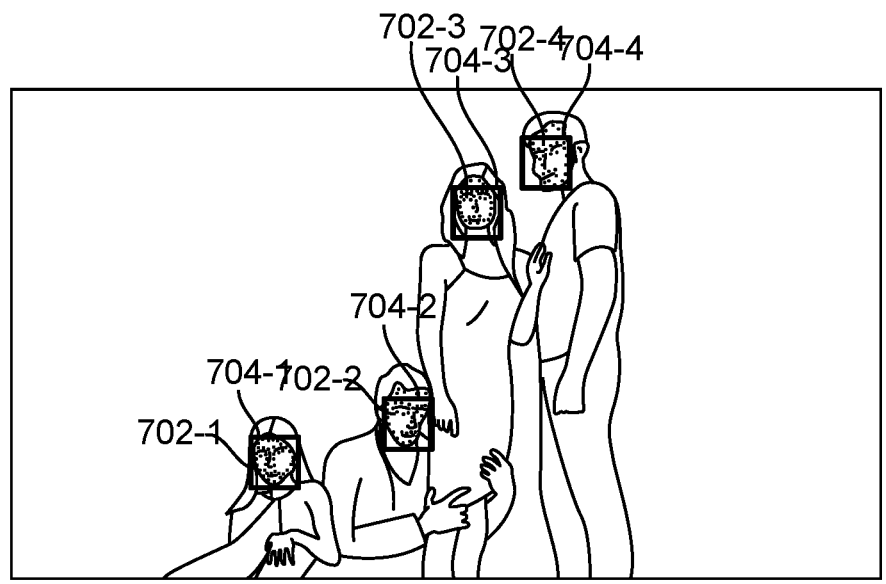
FIG. 7A shows an example of detecting four faces and generating four attention regions according to some embodiments.
Figure 7B:
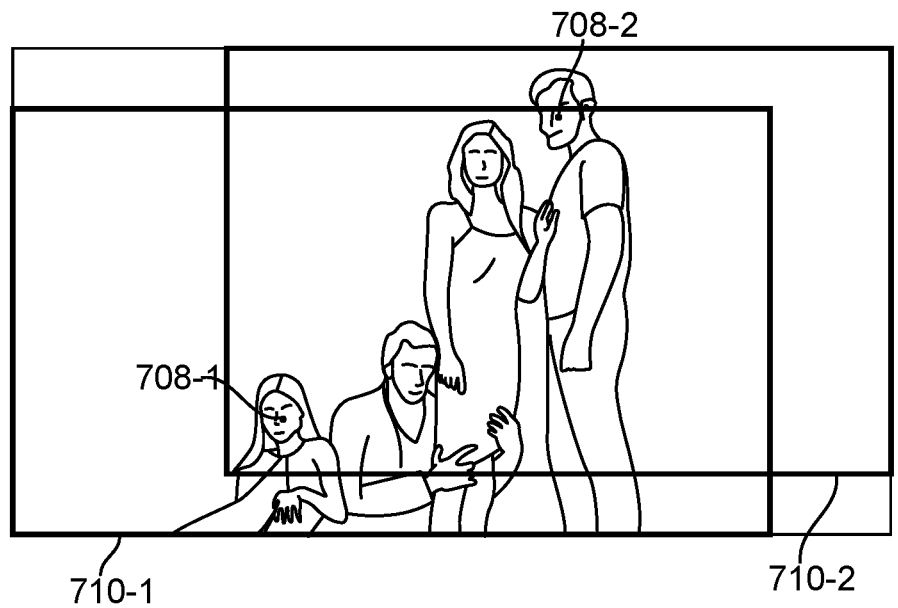
FIG. 7B shows an example of focus points and focus boxes generated from the four detected faces according to some embodiments.

FIGS. 7A and 7B depict examples where more than two objects are detected according to some embodiments. When more than two objects are detected, motion effect generator 106 may select two focus points in some embodiments. FIG. 7A shows an example where four objects are detected according to some embodiments. Four objects are shown with detected facial points at 702-1 to 702-4 that define four faces. Motion effect generator 106 generates four attention regions around the points shown at 704-1 to 704-4.

FIG. 7B shows an example of focus boxes that are generated for focus points according to some embodiments. Motion effect generator 106 may select two focus points 708-1 and 708-2 from the four attention regions 704-1 to 704-4. In some embodiments, motion effect generator 106 may generate focus points for all the attention regions. Then, motion effect generator 106 selects the left-most focus point and the right-most focus point. In other embodiments, motion effect generator 106 may select other focus points, such as the bottom-most and the top-most or the bottom-left-most points and the top-right-most focus points. One reason why motion effect generator 106 selects the left-most and right-most focus points is because the panning effect will then pan the largest amount of distance. However, motion effect generator 106 may also analyze the characteristics of the image to select the focus points. For example, motion effect generator 106 may select focus points for two faces that avoid the text being displayed on interface 112. Also, motion effect generator 106 may select focus points for characters that are considered the main characters in the image so that the panning effect will highlight these characters.

Focus boxes 710-1 and 710-2 are generated based on the focus points at 708-1 and 708-2. As described above, motion effect generator 106 may attempt to generate focus boxes to have a center point that is close to the focus point. If the focus point is off center, the focus point may not be in the center of the box due to the boundary of the image constraining where the focus box can be placed.

Figure 8A:
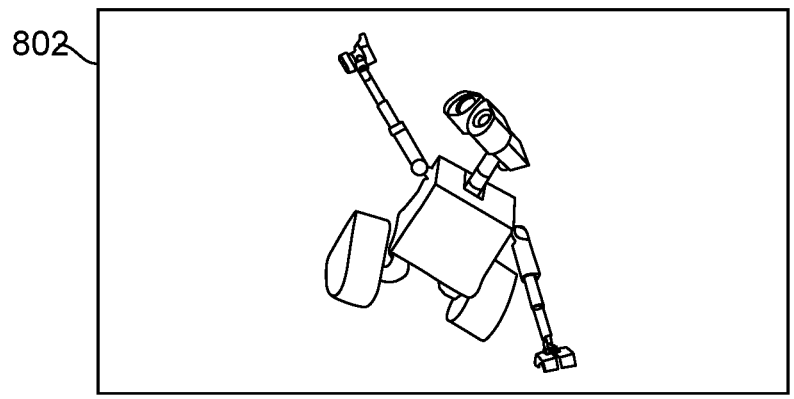
FIG. 8A shows an example of an image that is used for salient object detection according to some embodiments.
Figure 8B:
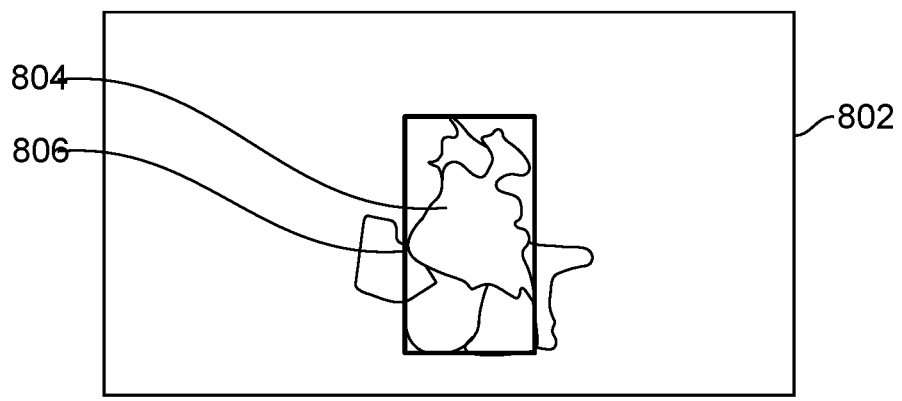
FIG. 8B shows an example of detecting salient regions and generating a corresponding attention region according to some embodiments.
Figure 8C:
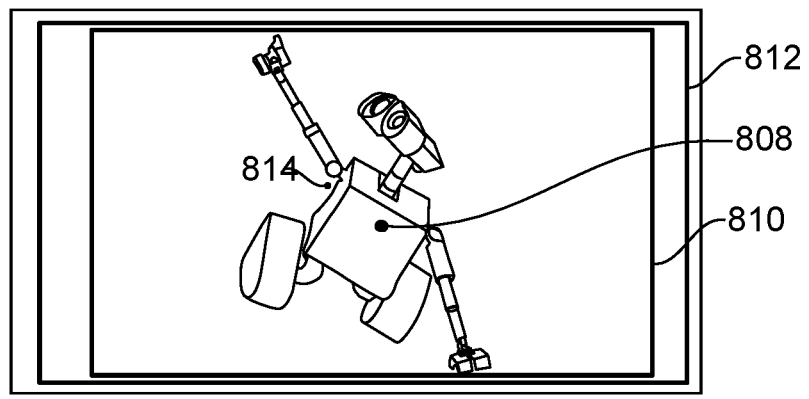
FIG. 8C shows an example of focus points and focus boxes generated from the detected salient region according to some embodiments.

The above process may also be performed with salient objects. FIGS. 8A to 8C depict an example of generating focus boxes using salient objects according to some embodiments. FIG. 8A shows an image 802 that is used for salient detection according to some embodiments. For example, a robot is shown in image 802. Motion effect generator 106 may run saliency detection on image 802 to detect regions that stand out from other regions in image 802.

FIG. 8B shows an example detecting salient objects in image 802 according to some embodiments. For example, portions of the robot shown in image 802 may be detected as salient regions 804. Then, an attention region 806 that encompasses the salient regions is generated. The attention region may or may not enclose all of the regions. For example, some of the regions may be more distinctive than others, and only those regions are enclosed in the attention region.

FIG. 8C shows an example of generating focus points and focus boxes according to some embodiments. Motion effect generator 106 may generate a focus point 808 in the center of the salient object although other positions in the salient object may be used, and another focus point 814 at another position, such as at the center of the image. Then, since there is only one attention region, motion effect generator 106 generates a smaller focus box at 810 based on the focus point 808, and a larger focus box 812 based on focus point 814. This can create a zoom-in effect when the content inside focus box 812 is zoomed in to the content located in a focus box 810. The opposite zoom out effect may also be performed from the focus box 810 to focus box 812.

The process to generate attention regions, focus points, and focus boxes for multiple salient objects may be similar to that described with respect to the faces detected above. Additionally, a combination of salient objects and facial objects may be used to generate attention regions, focus points, and focus boxes. When both a salient object and facial object are detected, once the focus points are determined, the focus points are used to generate the focus boxes.

Overall Process

Figure 9:
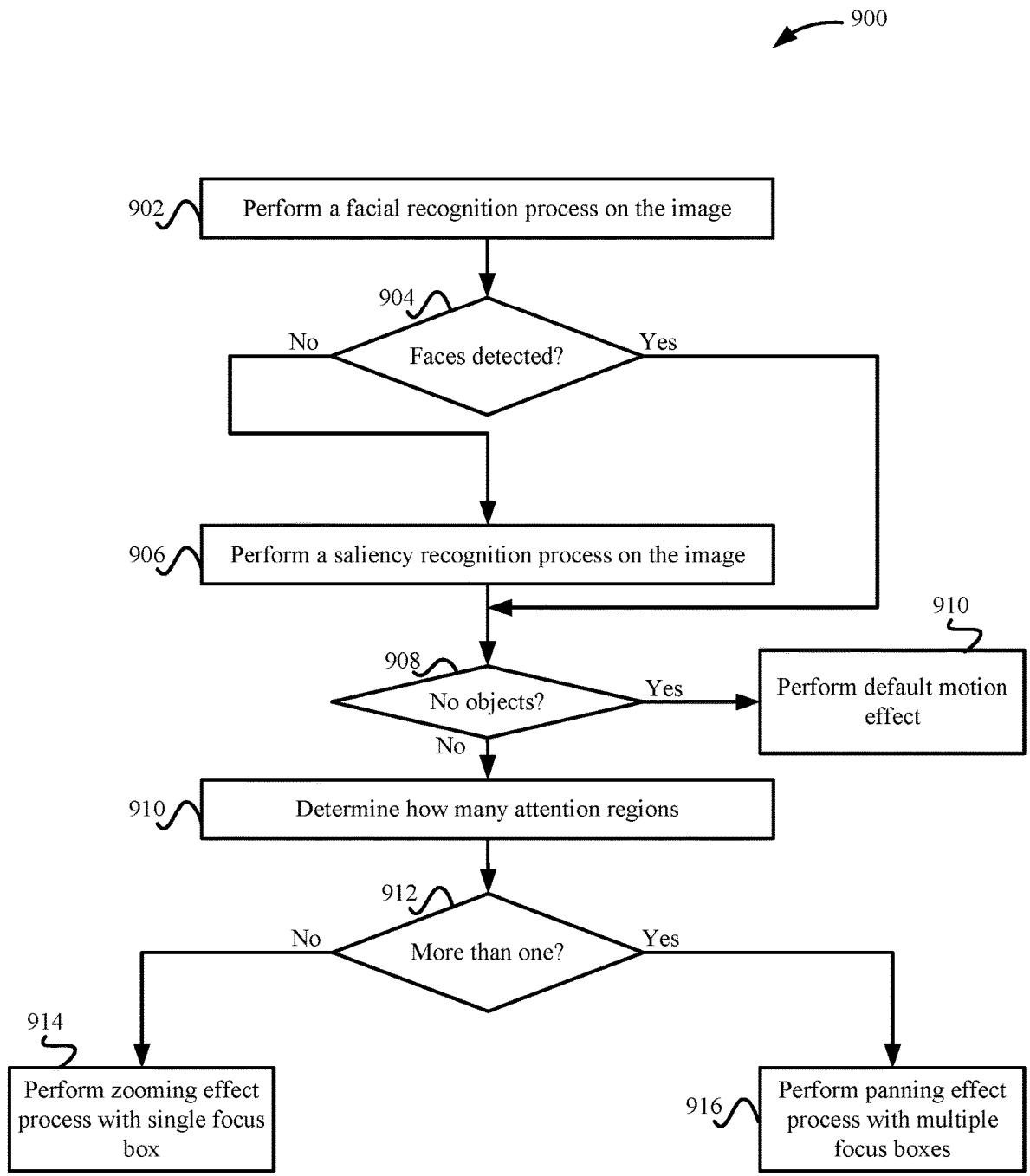
FIG. 9 depicts a simplified flowchart of a method for performing the overall process according to some embodiments.

FIG. 9 depicts a simplified flowchart 900 of a method for performing the overall process according to some embodiments. Although this process is described, it will be understood that the steps described may be performed in a different order or be omitted as discussed below. At 902, motion effect generator 106 performs facial recognition on the image to detect faces in the image. Although facial recognition is described, other features of a human can be detected. At 904, motion effect generator 106 determines if any faces were detected. If not, at 906, motion effect generator 106 performs a saliency recognition process on the image to detect salient objects. Although the saliency recognition process is described as being performed only after the facial recognition process, motion effect generator 106 may perform the saliency detection first and then the facial recognition. However, faces in the video may be more likely to yield focus points that are relevant to a viewer than salient objects, so the recognized faces may be used if found.

At 908, motion effect generator 106 determines if no objects (facial or salient) were detected. In this case, at 910, motion effect generator 106 performs a default motion effect. For example, two default focus points are used, such as one in the center point of the image (e.g., 0.5*iw, 0.5*ih) and a second focus point is selected that is off center, such as [0.618*iw, (1-0.618)*ih], which is a point at the top right plane of the image that may be designed to provide a good zooming/panning effect. In the equation above, the variables iw and ih are the width and height of the image, respectively.

If there are objects found, then, at 912, motion effect generator 106 determines how many attention regions are in the image. In the above process, if facial objects are found, then the process skips the saliency detection. But, the saliency may not be skipped and both facial objects and salient objects may be detected. The number of attention regions may be one, or two or more. If there is only one attention region, then, at 914, motion effect generator 106 performs the zooming motion effect process. If there is more than one attention region, then motion effect generator 106 performs the panning effect process with multiple focus boxes as described above.

Generation of Motion Effects With Structure of Interface 112

Figure 10:
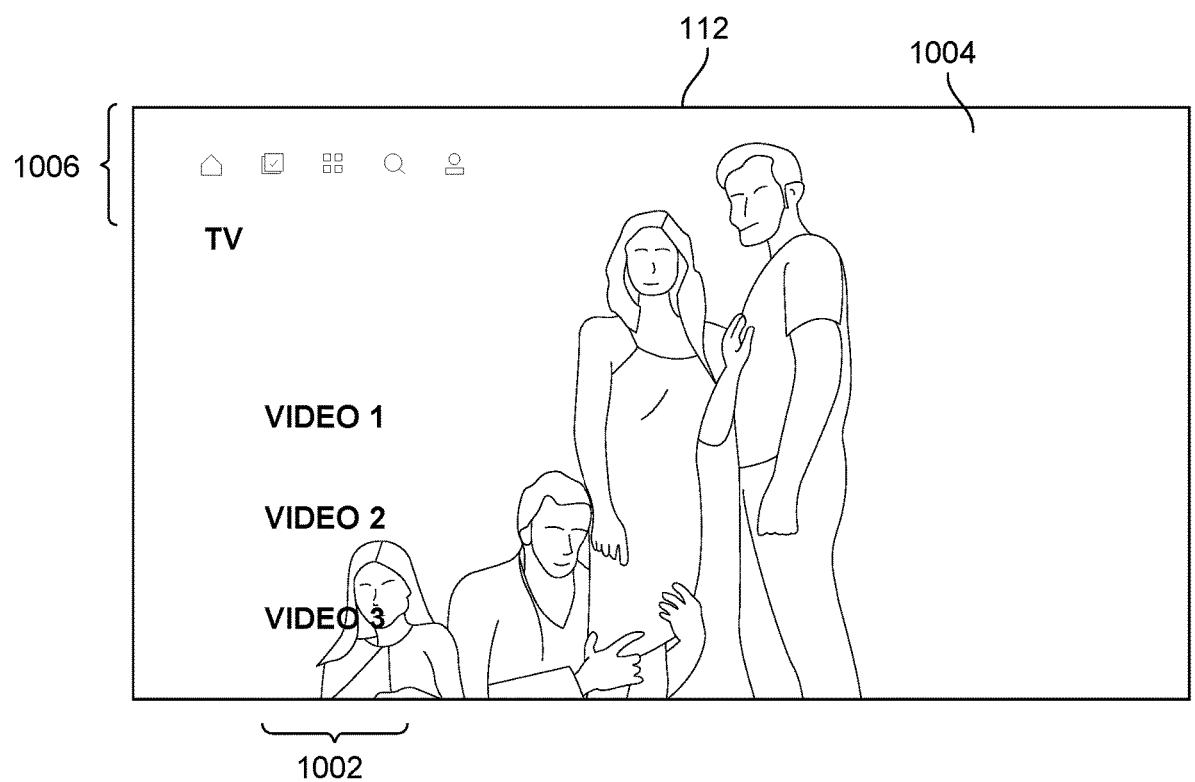
FIG. 10 depicts an example of an interface according to some embodiments.

Interface 112 may include certain features, such as text or menu items that may limit how the zoom effect or panning effect may be used. FIG. 10 depicts an example of interface 112 according to some embodiments. Interface 112 may include text shown at 1002, which may identify one or more videos that a user can select to view. In some embodiments, when a video is selected, an image from that video may be displayed at 1004. When the motion effect is applied to the image, it may be desirable to have the motion effect avoid the text shown at 1002 or menus shown at 1006. For example, the zoom effect may zoom in on an object that is not behind the text in interface 112. Also, the panning effect may pan to a focus point that is not behind the text shown at 1002. In the step of computing the position of focus boxes based on focus points, beside the limitation of image boundary, the system may add more constraints, such as that the focus boxes cannot have any overlap with the text regions in the interface 112.

Conclusion

Accordingly, some embodiments use focus points that are used to generate focus boxes. This allows motion effect generator 106 to select which motion effect to apply and generate the motion effect automatically. Motion effects that are generated may be effects that are standardized via criteria and also provide semantically meaningful and comprehensible motion effects. Motion effect generator 106 generates the meaningful and comprehensible motion effects by using the object detection process first, and then using the detected objects to generate focus points. The use of focus points allows a previously manual process to be performed automatically by generating focus boxes based on the focus points. The automatic process improves the speed of generating the motion effects, as well as resulting in more meaningful and comprehensible motion effects than a manual approach.

The above process may take into account different scenarios (e.g., the number of objects detected) to select a type of motion effect to use. The motion effect generation process then creates the motion effect for the image. In taking account the different scenarios, the process may run automatically to generate a motion effect for all images that are received. Manual inputs such as pre-defined locations are not needed. The motion effect process can also be performed on a large-scale number of images, such as the images from a large video library.

System

Figure 11:
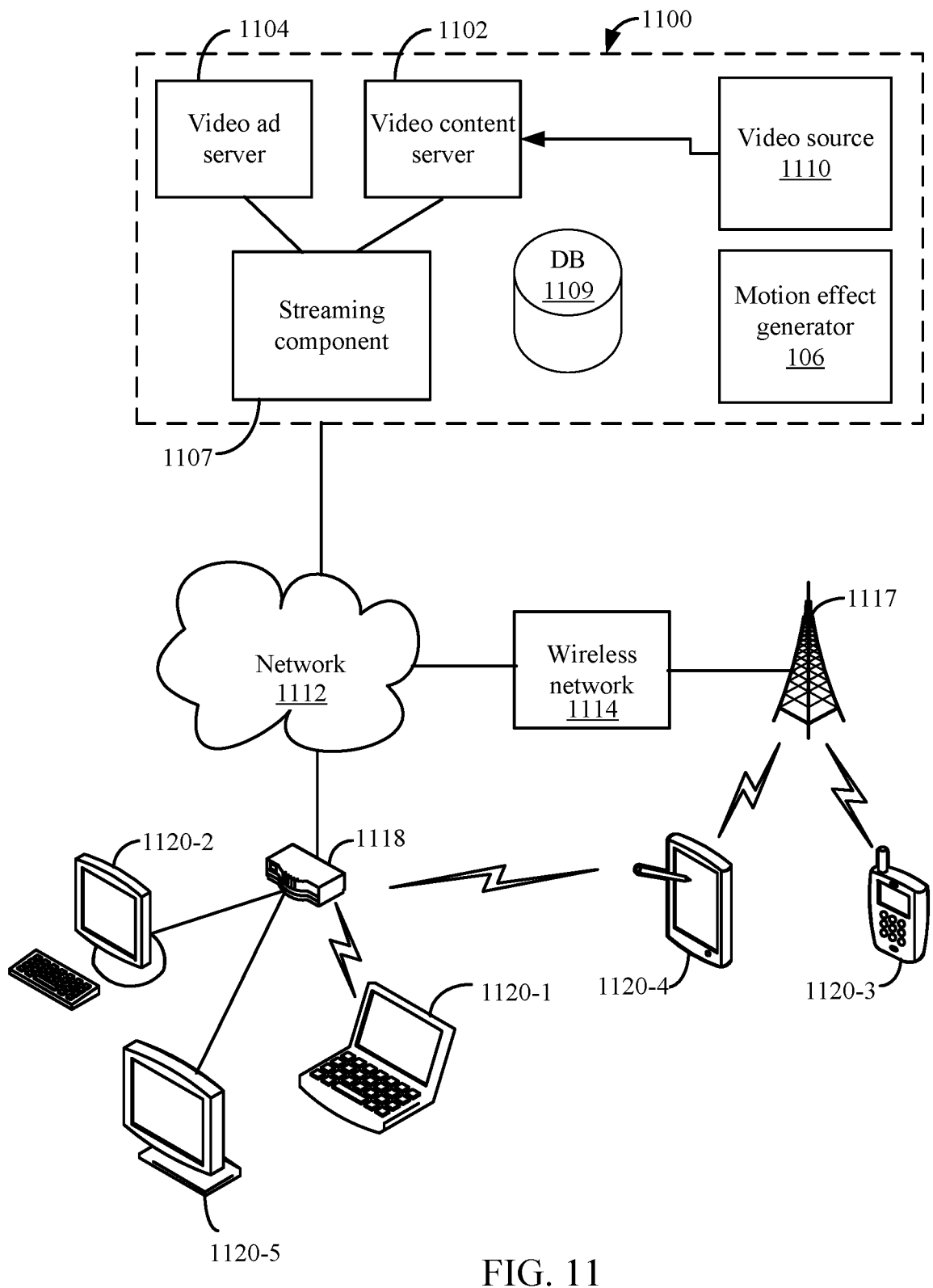
FIG. 11 depicts a video streaming system in communication with multiple client devices via one or more communication networks according to one embodiment.

Features and aspects as disclosed herein may be implemented in conjunction with a video streaming system 1100 in communication with multiple client devices via one or more communication networks as shown in FIG. 11. Aspects of the video streaming system 1100 are described merely to provide an example of an application for enabling distribution and delivery of content prepared according to the present disclosure. It should be appreciated that the present technology is not limited to streaming video applications, and may be adapted for other applications and delivery mechanisms.

In one embodiment, a media program provider may include a library of media programs. For example, the media programs may be aggregated and provided through a site (e.g., website), application, or browser. A user can access the media program provider's site or application and request media programs. The user may be limited to requesting only media programs offered by the media program provider.

In system 1100, video data may be obtained from one or more sources, for example, from a video source 1110, for use as input to a video content server 1102. The input video data may comprise raw or edited frame-based video data in any suitable digital format, for example, Moving Pictures Experts Group (MPEG)-1, MPEG-2, MPEG-4, VC-1, H.264/Advanced Video Coding (AVC), High Efficiency Video Coding (HEVC), or other format. In an alternative, a video may be provided in a non-digital format and converted to digital format using a scanner and/or transcoder. The input video data may comprise video clips or programs of various types, for example, television episodes, motion pictures, and other content produced as primary content of interest to consumers. The video data may also include audio or only audio may be used.

The video streaming system 1100 may include one or more computer servers or modules 1102, 1104, and/or 1107 distributed over one or more computers. Each server 1102, 1104, 1107 may include, or may be operatively coupled to, one or more data stores 1109, for example databases, indexes, files, or other data structures. A video content server 1102 may access a data store (not shown) of various video segments. The video content server 1102 may serve the video segments as directed by a user interface controller communicating with a client device. As used herein, a video segment refers to a definite portion of frame-based video data, such as may be used in a streaming video session to view a television episode, motion picture, recorded live performance, or other video content.

In some embodiments, a video advertising server 1104 may access a data store of relatively short videos (e.g., 10 second, 30 second, or 60 second video advertisements) configured as advertising for a particular advertiser or message. The advertising may be provided for an advertiser in exchange for payment of some kind, or may comprise a promotional message for the system 1100, a public service message, or some other information. The video advertising server 1104 may serve the video advertising segments as directed by a user interface controller (not shown).

The video streaming system 1100 also may include motion effect generator 106.

The video streaming system 1100 may further include an integration and streaming component 1107 that integrates video content and video advertising into a streaming video segment. For example, streaming component 1107 may be a content server or streaming media server. A controller (not shown) may determine the selection or configuration of advertising in the streaming video based on any suitable algorithm or process. The video streaming system 1100 may include other modules or units not depicted in FIG. 11, for example, administrative servers, commerce servers, network infrastructure, advertising selection engines, and so forth.

The video streaming system 1100 may connect to a data communication network 1112. A data communication network 1112 may comprise a local area network (LAN), a wide area network (WAN), for example, the Internet, a telephone network, a wireless cellular telecommunications network (WCS) 1114, or some combination of these or similar networks.

One or more client devices 1120 may be in communication with the video streaming system 1100, via the data communication network 1112, wireless cellular telecommunications network 1114, and/or another network. Such client devices may include, for example, one or more laptop computers 1120-1, desktop computers 1120-2, "smart" mobile phones 1120-3, tablet devices 1120-4, network-enabled televisions 1120-5, game consoles, streaming sticks, set-top-boxes, or combinations thereof, via a router 1118 for a LAN, via a base station 1117 for a wireless cellular telecommunications network 1114, or via some other connection. In operation, such client devices 1120 may send and receive data or instructions to the system 1100, in response to user input received from user input devices or other input. In response, the system 1100 may serve video segments and metadata from the data store 1109 responsive to selection of media programs to the client devices 1120. Client devices 1120 may output the video content from the streaming video segment in a media player using a display screen, projector, or other video output device, and receive user input for interacting with the video content.

Distribution of audio-video data may be implemented from streaming component 1107 to remote client devices over computer networks, telecommunications networks, and combinations of such networks, using various methods, for example streaming. In streaming, a content server streams audio-video data continuously to a media player component operating at least partly on the client device, which may play the audio-video data concurrently with receiving the streaming data from the server. Although streaming is discussed, other methods of delivery may be used. The media player component may initiate play of the video data immediately after receiving an initial portion of the data from the content provider. Traditional streaming techniques use a single provider delivering a stream of data to a set of end users. High bandwidth and processing power may be required to deliver a single stream to a large audience, and the required bandwidth of the provider may increase as the number of end users increases.

Streaming media can be delivered on-demand or live. Streaming enables immediate playback at any point within the file. End-users may skip through the media file to start playback or change playback to any point in the media file. Hence, the end-user does not need to wait for the file to progressively download. Typically, streaming media is delivered from a few dedicated servers having high bandwidth capabilities via a specialized device that accepts requests for video files, and with information about the format, bandwidth and structure of those files, delivers just the amount of data necessary to play the video, at the rate needed to play it. Streaming media servers may also account for the transmission bandwidth and capabilities of the media player on the destination client. Streaming component 1107 may communicate with client device 1120 using control messages and data messages to adjust to changing network conditions as the video is played. These control messages can include commands for enabling control functions such as fast forward, fast reverse, pausing, or seeking to a particular part of the file at the client.

Since streaming component 1107 transmits video data only as needed and at the rate that is needed, precise control over the number of streams served can be maintained. The viewer will not be able to view high data rate videos over a lower data rate transmission medium. However, streaming media servers (1) provide users random access to the video file, (2) allow monitoring of who is viewing what video programs and how long they are watched, (3) use transmission bandwidth more efficiently, since only the amount of data required to support the viewing experience is transmitted, and (4) the video file is not stored in the viewer's computer, but discarded by the media player, thus allowing more control over the content.

Streaming component 1107 may use TCP-based protocols, such as HTTP and Real Time Messaging Protocol (RTMP). Streaming component 1107 can also deliver live webcasts and can multicast, which allows more than one client to tune into a single stream, thus saving bandwidth. Streaming media players may not rely on buffering the whole video to provide random access to any point in the media program. Instead, this is accomplished through the use of control messages transmitted from the media player to the streaming media server. Other protocols used for streaming are Hypertext Transfer Protocol (HTTP) Live Streaming (HLS) and Dynamic Adaptive Streaming over HTTP (DASH). The HLS and DASH protocols deliver video over HTTP via a playlist of small segments that are made available in a variety of bitrates typically from one or more content delivery networks (CDNs). This allows a media player to switch both bitrates and content sources on a segment-by-segment basis. The switching helps compensate for network bandwidth variances and also infrastructure failures that may occur during playback of the video.

The delivery of video content by streaming may be accomplished under a variety of models. In one model, the user pays for the viewing of video programs, for example, paying a fee for access to the library of media programs or a portion of restricted media programs, or using a pay-per-view service. In another model widely adopted by broadcast television shortly after its inception, sponsors pay for the presentation of the media program in exchange for the right to present advertisements during or adjacent to the presentation of the program. In some models, advertisements are inserted at predetermined times in a video program, which times may be referred to as "ad slots" or "ad breaks." With streaming video, the media player may be configured so that the client device cannot play the video without also playing predetermined advertisements during the designated ad slots.

Figure 12:
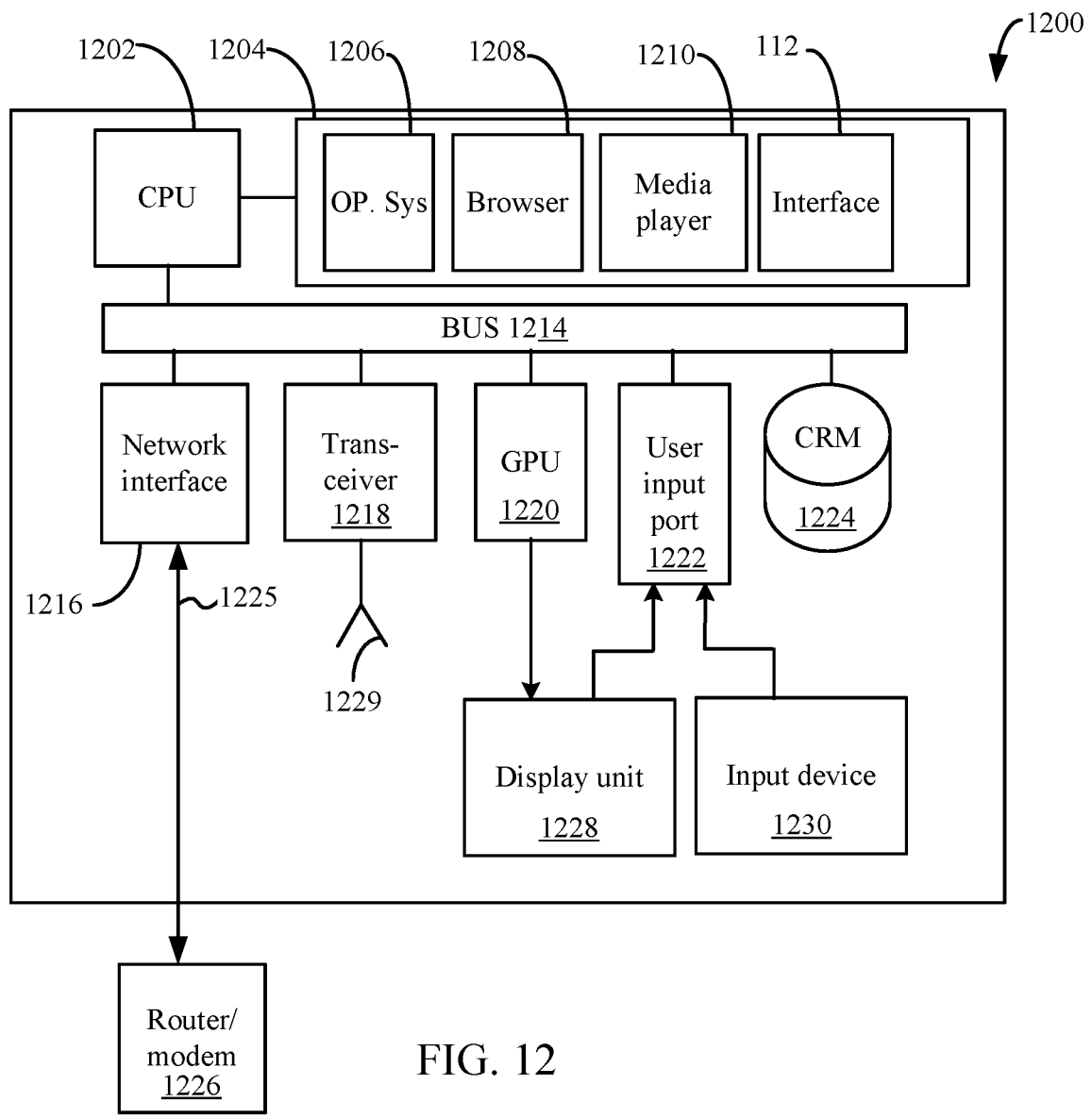
FIG. 12 depicts a diagrammatic view of an apparatus for viewing video content and advertisements.

Referring to FIG. 12, a diagrammatic view of an apparatus 1200 for viewing video content and advertisements is illustrated. In selected embodiments, the apparatus 1200 may include a processor (CPU) 1202 operatively coupled to a processor memory 1204, which holds binary-coded functional modules for execution by the processor 1202. Such functional modules may include an operating system 1206 for handling system functions such as input/output and memory access, a browser 1208 to display web pages, and media player 1210 for playing video. The modules may further include interface 112. The memory 1204 may hold additional modules not shown in FIG. 12, for example modules for performing other operations described elsewhere herein.

A bus 1214 or other communication component may support communication of information within the apparatus 1200. The processor 1202 may be a specialized or dedicated microprocessor configured to perform particular tasks in accordance with the features and aspects disclosed herein by executing machine-readable software code defining the particular tasks. Processor memory 1204 (e.g., random access memory (RAM) or other dynamic storage device) may be connected to the bus 1214 or directly to the processor 1202, and store information and instructions to be executed by a processor 1202. The memory 1204 may also store temporary variables or other intermediate information during execution of such instructions.

A computer-readable medium (CRM) in a storage device 1224 may be connected to the bus 1214 and store static information and instructions for the processor 1202; for example, the storage device (CRM) 1224 may store the modules 1206, 1208, and 1210 when the apparatus 1200 is powered off, from which the modules may be loaded into the processor memory 1204 when the apparatus 1200 is powered up. The storage device 1224 may include a non-transitory computer-readable storage medium holding information, instructions, or some combination thereof, for example instructions that when executed by the processor 1202, cause the apparatus 1200 to be configured to perform one or more operations of a method as described herein.

A communication interface 1216 may also be connected to the bus 1214. The communication interface 1216 may provide or support two-way data communication between the apparatus 1200 and one or more external devices, e.g., the streaming system 1200, optionally via a router/modem 1226 and a wired or wireless connection. In the alternative, or in addition, the apparatus 1200 may include a transceiver 1218 connected to an antenna 1229, through which the apparatus 1200 may communicate wirelessly with a base station for a wireless communication system or with the router/modem 1226. In the alternative, the apparatus 1200 may communicate with a video streaming system 1100 via a local area network, virtual private network, or other network. In another alternative, the apparatus 1200 may be incorporated as a module or component of the system 1100 and communicate with other components via the bus 1214 or by some other modality.

The apparatus 1200 may be connected (e.g., via the bus 1214 and graphics processing unit 1220) to a display unit 1228. A display 1228 may include any suitable configuration for displaying information to an operator of the apparatus 1200. For example, a display 1228 may include or utilize a liquid crystal display (LCD), touchscreen LCD (e.g., capacitive display), light emitting diode (LED) display, projector, or other display device to present information to a user of the apparatus 1200 in a visual display.

One or more input devices 1230 (e.g., an alphanumeric keyboard, microphone, keypad, remote controller, game controller, camera or camera array) may be connected to the bus 1214 via a user input port 1222 to communicate information and commands to the apparatus 1200. In selected embodiments, an input device 1230 may provide or support control over the positioning of a cursor. Such a cursor control device, also called a pointing device, may be configured as a mouse, a trackball, a track pad, touch screen, cursor direction keys or other device for receiving or tracking physical movement and translating the movement into electrical signals indicating cursor movement. The cursor control device may be incorporated into the display unit 1228, for example using a touch sensitive screen. A cursor control device may communicate direction information and command selections to the processor 1202 and control cursor movement on the display 1228. A cursor control device may have two or more degrees of freedom, for example allowing the device to specify cursor positions in a plane or three-dimensional space.

Particular embodiments may be implemented in a non-transitory computer-readable storage medium for use by or in connection with the instruction execution system, apparatus, system, or machine. The computer-readable storage medium contains instructions for controlling a computer system to perform a method described by particular embodiments. The computer system may include one or more computing devices. The instructions, when executed by one or more computer processors, may be configured to perform that which is described in particular embodiments.

As used in the description herein and throughout the claims that follow, "a", "an", and "the" includes plural references unless the context clearly dictates otherwise. Also, as used in the description herein and throughout the claims that follow, the meaning of "in" includes "in" and "on" unless the context clearly dictates otherwise.

The above description illustrates various embodiments along with examples of how aspects of particular embodiments may be implemented. The above examples and embodiments should not be deemed to be the only embodiments, and are presented to illustrate the flexibility and advantages of particular embodiments as defined by the following claims. Based on the above disclosure and the following claims, other arrangements, embodiments, implementations and equivalents may be employed without departing from the scope hereof as defined by the claims.

What is claimed is:
1. A method comprising:
   generating, by a computing device, an attention region that is positioned in an image based on a first position of an object that is detected in the image;

analyzing, by the computing device, the attention region to select a type of motion effect;

generating, by the computing device, a first focus point at a second position and a second focus point at a third position, wherein at least one of the first focus point and the second focus point generated based on the attention region;

generating, by the computing device, a first focus box using the second position and a second focus box using the third position, wherein the first focus box includes first content in the image and the second focus box includes second content in the image; and generating, by the computing device, information for the type of motion effect using content of the image based on the first focus box and the second focus box, wherein the first content in the image and the second content in the image are included in the motion effect.

2. The method of claim 1, wherein generating information for the type of motion effect comprises:
generating information for a zooming motion effect when a number of attention regions is one.

3. The method of claim 2, wherein the zooming motion effect moves from the first focus box to the second focus box to create a zooming in effect.

4. The method of claim 1, wherein:
the second focus box is based on a size of the attention region,
the first focus box is larger than the second focus box.

5. The method of claim 1, wherein generating the information for the type of motion effect comprises:
generating information for a panning motion effect when a number of attention regions is two or more.

6. The method of claim 5, wherein the panning motion effect moves from the first focus box to the second focus box to create the panning motion effect.

7. The method of claim 1, wherein detecting the object comprises detecting at least a portion of a human object.

8. The method of claim 1, wherein detecting the object comprises detecting a salient object.

9. The method of claim 1, wherein generating the attention region comprises:
using an outline of a face or an outline of a salient region to generate the attention region, wherein the attention region includes the outline of the face or the outline of the salient region.

10. The method of claim 1, wherein the at least one of the first focus point and the second focus point is positioned in the attention region.

11. The method of claim 1, wherein at least one of the first focus point and the second focus point is positioned in a facial region or in a salient object.

12. The method of claim 1, further comprising:
when more than two focus points are included in the image, selecting two of the focus points to use to generate the first focus box and the second focus box.

13. The method of claim 1, further comprising:
performing a facial detection process to detect facial objects in the image; and
when no facial objects are detected, performing a salient object detection process to detect salient objects in the image.

14. The method of claim 13, further comprising:
when no facial objects and salient objects are detected in the image, using default focus points as the first focus point and the second focus point.

15. The method of claim 1, wherein generating information for the motion effect comprises:
using a structure of an interface in which the image will be displayed to generate the motion effect.

16. The method of claim 15, wherein using the structure comprises:
generating the first focus point and the second focus point at positions different from text displayed on the interface.

17. The method of claim 1, wherein analyzing the attention region to select the type of motion effect comprises:
selecting one of a plurality of types of motion effect to apply to the image based on the attention region in the image.

18. The method of claim 17, wherein selecting comprises:
eliminating some objects that are detected based on a criterion, and
selecting the one of the plurality of types of motion effect based on remaining objects in the image.

19. A non-transitory computer-readable storage medium containing instructions, that when executed, control a computer system to be configured for:
generating an attention region that is positioned in an image based on a first position of an object that is detected in the image;
analyzing the attention region to select a type of motion effect;
generating a first focus point at a second position and a second focus point at a third position, wherein at least one of the first focus point and the second focus point generated based on the attention region;
generating a first focus box using the second position and a second focus box using the third position, wherein the first focus box includes first content in the image and the second focus box includes second content in the image; and
generating information for the type of motion effect using content of the image based on the first focus box and the second focus box, wherein the first content in the image and the second content in the image are included in the motion effect.

20. An apparatus comprising:
one or more computer processors; and
a non-transitory computer-readable storage medium comprising instructions, that when executed, control the one or more computer processors to be configured for:
generating an attention region that is positioned in an image based on a first position of an object that is detected in the image;
analyzing the attention region to select a type of motion effect;
generating a first focus point at a second position and a second focus point at a third position, wherein at least one of the first focus point and the second focus point generated based on the attention region;
generating a first focus box using the second position and a second focus box using the third position, wherein the first focus box includes first content in the image and the second focus box includes second content in the image; and
generating information for the type of motion effect using content of the image based on the first focus box and the second focus box, wherein the first content in the image and the second content in the image are included in the motion effect.

* * * * *